(12) United States Patent
Dutton et al.

(10) Patent No.: US 11,303,859 B2
(45) Date of Patent: Apr. 12, 2022

(54) TIME OF FLIGHT SENSING FOR BRIGHTNESS AND AUTOFOCUS CONTROL IN IMAGE PROJECTION DEVICES

(71) Applicants: STMicroelectronics (Research & Development) Limited, Marlow (GB); STMicroelectronics, Inc., Coppell, TX (US)

(72) Inventors: Neale Dutton, Edinburgh (GB); Xiaoyong Yang, Cupertino, CA (US); Kevin Channon, Edinburgh (GB)

(73) Assignees: STMicroelectronics (Research & Development) Limited, Marlow (GB); STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 15/280,171

(22) Filed: Sep. 29, 2016

(65) Prior Publication Data
US 2018/0091784 A1    Mar. 29, 2018

(51) Int. Cl.
*H04N 9/31* (2006.01)
*G03B 21/20* (2006.01)
(Continued)

(52) U.S. Cl.
CPC ......... *H04N 9/3155* (2013.01); *G01S 7/4865* (2013.01); *G01S 17/10* (2013.01); *G03B 21/142* (2013.01); *G03B 21/2053* (2013.01); *G03B 21/53* (2013.01); *H04N 9/3102* (2013.01); *H04N 9/315* (2013.01); *H04N 9/317* (2013.01);
(Continued)

(58) Field of Classification Search
CPC .... H04N 9/3155; H04N 9/317; H04N 9/3185; H04N 9/315; H04N 9/3161; G01S 17/10; G03B 21/142; G03B 21/2046; G03B 21/2053
See application file for complete search history.

(56) References Cited

U.S. PATENT DOCUMENTS 8,038,303 B2 * 10/2011 Inoue .................. H04N 9/317
353/70
8,506,093 B2 * 8/2013 Kato .................... G03B 21/142
353/101
(Continued)

FOREIGN PATENT DOCUMENTS

EP        2 469 294 A1    6/2012
GB        2510891 A       8/2014
JP        2011-7948 A     1/2011

*Primary Examiner* — John W Miller
*Assistant Examiner* — Humam M Satti
(74) *Attorney, Agent, or Firm* — Seed IP Law Group LLP

(57) ABSTRACT

An image projection device, such as a pico projector or LCD projector, includes image projection circuitry configured to generate a light beam having a power. The image projection circuitry projects the light beam onto and focuses the light beam on a projection surface located an imaging distance from the image projection circuitry. A time-of-flight sensor is configured to sense the imaging distance between the image projection circuitry and the projection surface and to generate an imaging distance signal indicating the sensed imaging distance. Control circuitry is coupled to the image projection circuitry and to the time-of-flight sensor and is configured to adjust the power and the focus of the light beam based upon the imaging distance signal.

22 Claims, 9 Drawing Sheets

(51) Int. Cl.
  *G03B 21/53* (2006.01)
  *G01S 7/4865* (2020.01)
  *G01S 17/10* (2020.01)
  *G03B 21/14* (2006.01)
(52) U.S. Cl.
  CPC ......... *H04N 9/3129* (2013.01); *H04N 9/3161* (2013.01); *H04N 9/3185* (2013.01); *H04N 9/3194* (2013.01)

(56) References Cited

U.S. PATENT DOCUMENTS

| | | | |
|---|---|---|---|
| 9,140,971 B2* | 9/2015 | Woltman | H04N 9/3155 |
| 9,282,301 B1 | 3/2016 | Cederlof | |
| 9,304,379 B1 | 4/2016 | Wang et al. | |
| 2003/0223049 A1* | 12/2003 | Ohara | G03B 21/14 |
| | | | 353/101 |
| 2005/0062939 A1* | 3/2005 | Tamura | G03B 21/145 |
| | | | 353/69 |
| 2006/0262371 A1 | 11/2006 | Tan et al. | |
| 2009/0147272 A1* | 6/2009 | Gibson | H04N 9/3155 |
| | | | 356/623 |
| 2010/0214540 A1* | 8/2010 | Sajadi | G03B 3/00 |
| | | | 353/101 |
| 2011/0199588 A1* | 8/2011 | Kato | G03B 21/142 |
| | | | 353/85 |
| 2011/0304833 A1* | 12/2011 | Osaka | H04M 1/0202 |
| | | | 353/85 |
| 2012/0120375 A1* | 5/2012 | Kilcher | H04N 9/3194 |
| | | | 353/98 |
| 2012/0132788 A1 | 5/2012 | Findlay | |
| 2014/0168525 A1* | 6/2014 | Hasegawa | G03B 21/53 |
| | | | 348/745 |
| 2014/0232643 A1 | 8/2014 | Al Dibs et al. | |
| 2015/0145768 A1* | 5/2015 | Drader | G06F 3/0325 |
| | | | 345/156 |
| 2015/0208019 A1 | 7/2015 | Stewart et al. | |
| 2015/0341609 A1* | 11/2015 | Kilcher | G02B 26/0833 |
| | | | 353/85 |
| 2016/0080709 A1* | 3/2016 | Viswanathan | H04N 9/3155 |
| | | | 353/85 |
| 2016/0142691 A1* | 5/2016 | Kobiki | H04N 9/3194 |
| | | | 348/746 |
| 2016/0191878 A1 | 6/2016 | Tagami | |
| 2016/0337626 A1* | 11/2016 | Mima | H04N 9/3194 |
| 2017/0026607 A1* | 1/2017 | Kim | H04N 9/3194 |
| 2017/0067734 A1* | 3/2017 | Heidemann | G01B 11/24 |
| 2017/0070662 A1* | 3/2017 | Honkanen | G03B 21/53 |
| 2017/0070714 A1* | 3/2017 | Honkanen | G01S 17/08 |

\* cited by examiner

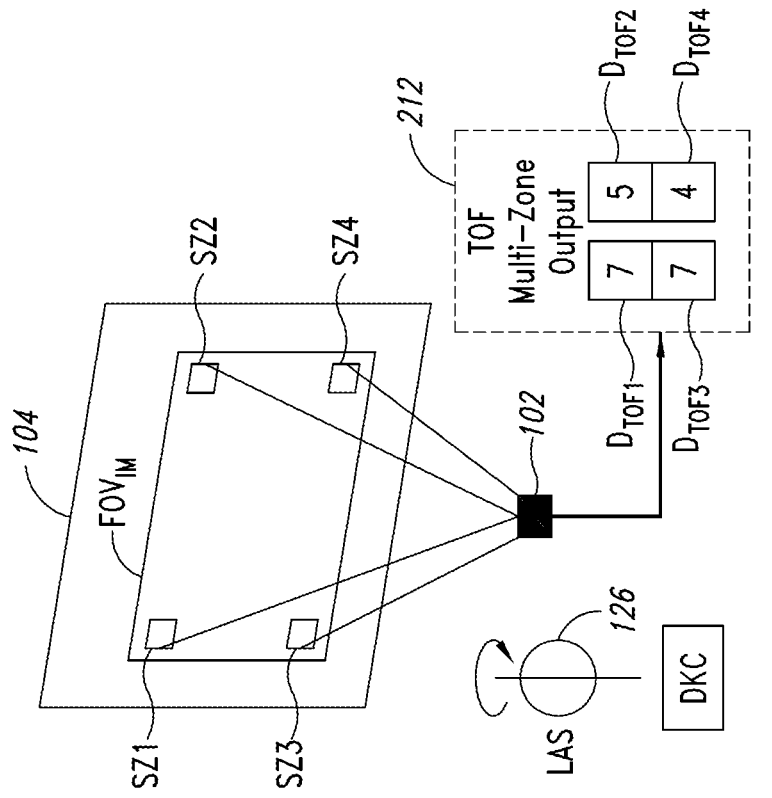
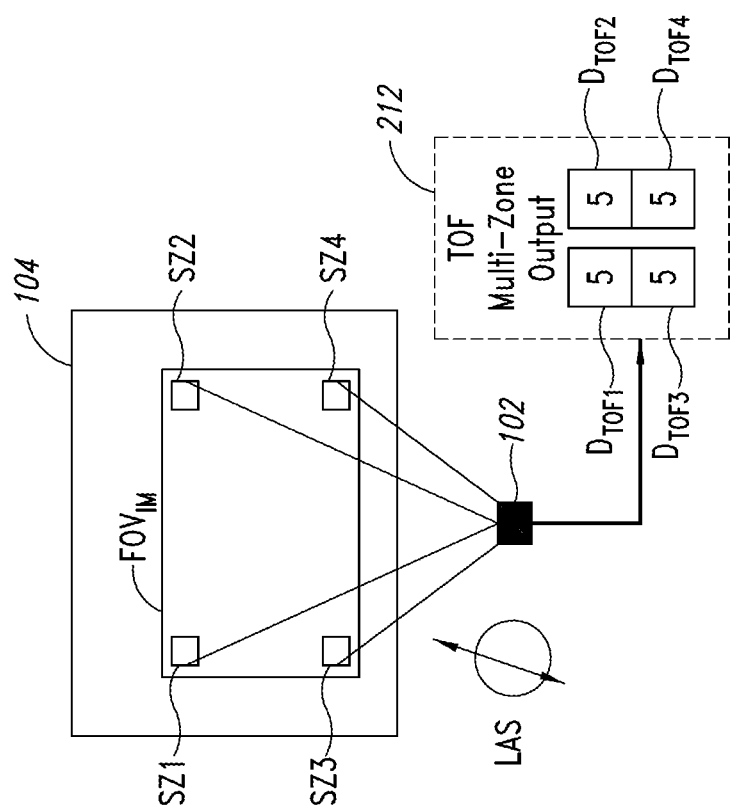
FIG. 9B
FIG. 9A

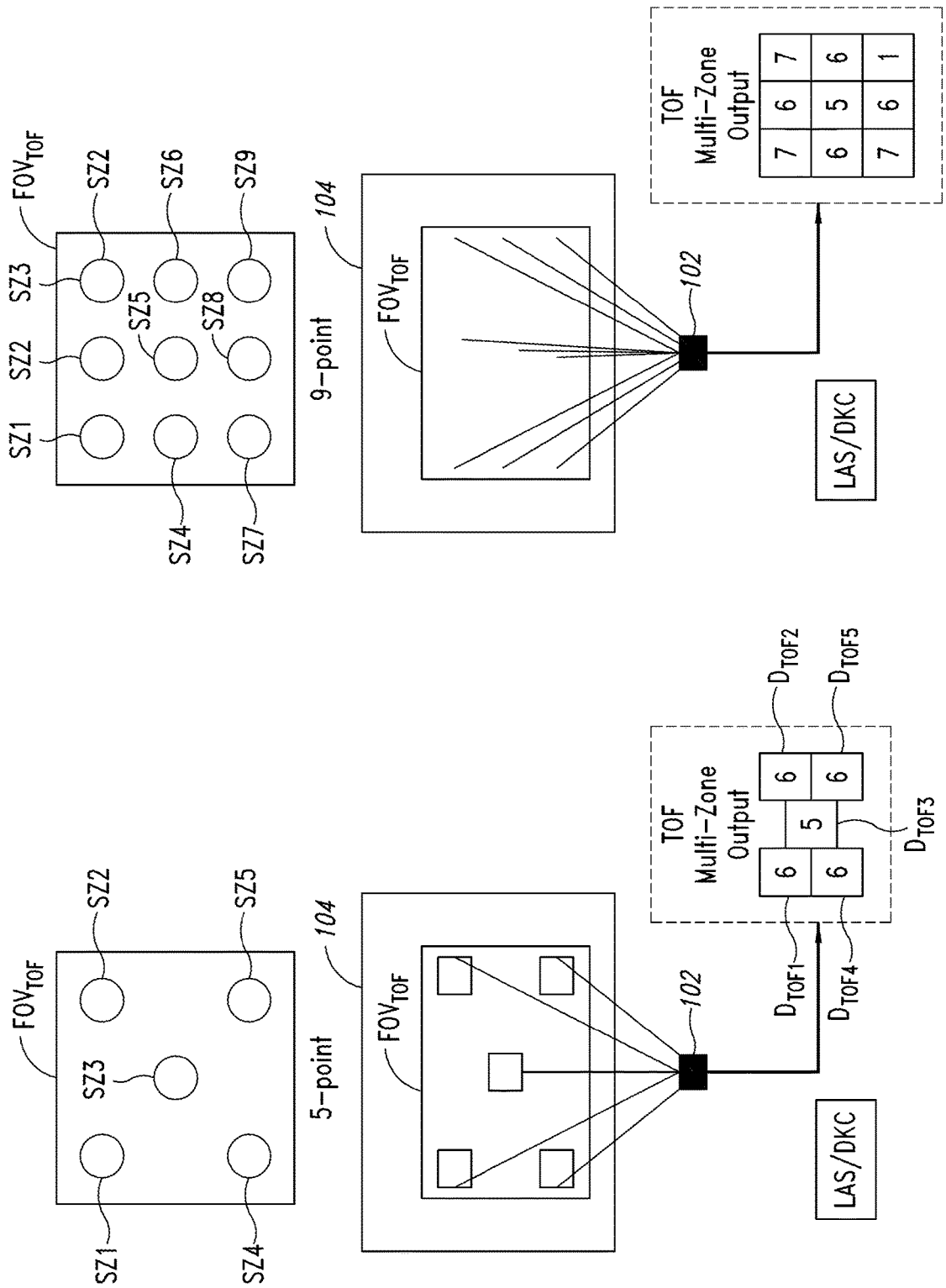

TIME OF FLIGHT SENSING FOR BRIGHTNESS AND AUTOFOCUS CONTROL IN IMAGE PROJECTION DEVICES

BACKGROUND

Technical Field

The present disclosure relates generally to time of flight sensing and more specifically to the utilization of time of flight sensing in brightness and autofocus control of mobile image projection devices such as pico projectors.

Description of the Related Art

Conventional image projection devices project digital images, either still images or video images, onto a nearby viewing surface such as a wall, screen or other suitable flat surface. A conventional image projection device may include, for example, an illumination source or lamp and a liquid crystal display (LCD) that operate in combination to project the digital images onto the viewing surface. One type of such an image projection device is a pico projector, which may also commonly be referred to as a handheld, pocket or mobile projector. A pico projector is a portable image projection device that includes an image projector for projecting digital images, either still images or video images, onto a nearby viewing surface such as a wall or other flat surface. A pico projector typically includes either laser diodes or light emitting diodes (LEDs) that operate in combination with a spatial modulation device, typically in the form of a microelectromechanical system (MEMS) scanning mirror, to project the digital images onto the viewing surface. Beams generated by the laser diodes are modulated to encode red, green and blue color information for pixels in the digital image being projected, and these beams are combined into a single combined beam that is then scanned onto the viewing surface by the MEMS scanning mirror.

Conventional pico projectors typically operate in an open loop fashion, meaning a user must manually adjust optics in the projector to focus the digital images being projected on the viewing surface. In addition to the need for manual focusing, this open loop operation may also result in undesirable variations in the brightness of the digital images being projected onto the viewing surface. For example, when the pico projector is nearer the viewing surface the projected images may be too bright and, conversely, when farther from the viewing surface the projected images may be too dim.

Pico projectors typically utilize Class 2 laser diodes or equivalent LEDs for generating the combined beam. A Class 2 laser diode or LEDs means the combined beam projected by the pico projector may be projected into the eye of a person without causing damage due to the protection provided by the normal human blink reflex, as will be appreciated by those skilled in the art. Thus, in conventional pico projectors using Class 2 laser diodes or LEDs, the normal blink reflex is relied upon to provide protection against eye injury due to the projected beam. As a result, there are concerns about eye injuries occurring. One concern, for example, is whether the blink reflex of a very young child will adequately protect that child's eyes where the child walks between the pico projector and the viewing surface during operation of the projector.

Similar concerns also exist where Class 2 laser diodes or LEDs are used in other applications, such as in time of flight sensing applications. Due at least in part to such concerns, Class 1 laser diodes or LEDs are typically used in such time of flight sensing applications. The concern of eye damage if Class 2 devices were to be used in time of flight sensing applications arises because the electromagnetic radiation or light generated by the Class 2 devices is not typically light in the visible spectrum. Instead, light in the infrared (IR) or other portion of the spectrum not visible to the human eye is typically used in time of flight sensing applications. As a result, a human eye may not sense illumination by such an IR beam and no blink reflex triggered, which could result in damage to the eye.

There is a need for improved control of projected light beams from conventional image projection devices such as pico projectors, as well as improved safety protection in image projection devices like pico projectors, as well as in other types of electronic devices, utilizing Class 2 devices for generating projected light beams.

BRIEF SUMMARY

In one embodiment of the present disclosure, an image projection device, such as a pico projector, LCD projector, or other type of projection device, includes image projection circuitry configured to generate a light beam having a power. The image projection circuitry projects the light beam onto and focuses the light beam on a projection surface located an imaging distance from the image projection circuitry. A time-of-flight sensor is configured to sense the imaging distance between the image projection circuitry and the projection surface and to generate an imaging distance signal indicating the sensed imaging distance. Control circuitry is coupled to the image projection circuitry and to the time-of-flight sensor and is configured to adjust the power and the focus of the light beam based upon the imaging distance signal.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which:

FIGS. 9A and 9B are functional diagrams illustrating the operation of the image projection devices of FIGS. 1A and 1B in generating the focus adjustment signal to adjust the focus of an image being projected when the TOF sensor includes the multi zone SPAD array of FIG. 6B; and FIGS. 10A and 10B are functional diagrams illustrating two possible spatial projection patterns that may be used in combination with multi zone SPAD arrays in the TOF sensor of FIG. 5 according to further embodiments of the present disclosure.

DETAILED DESCRIPTION

Figure 1A:
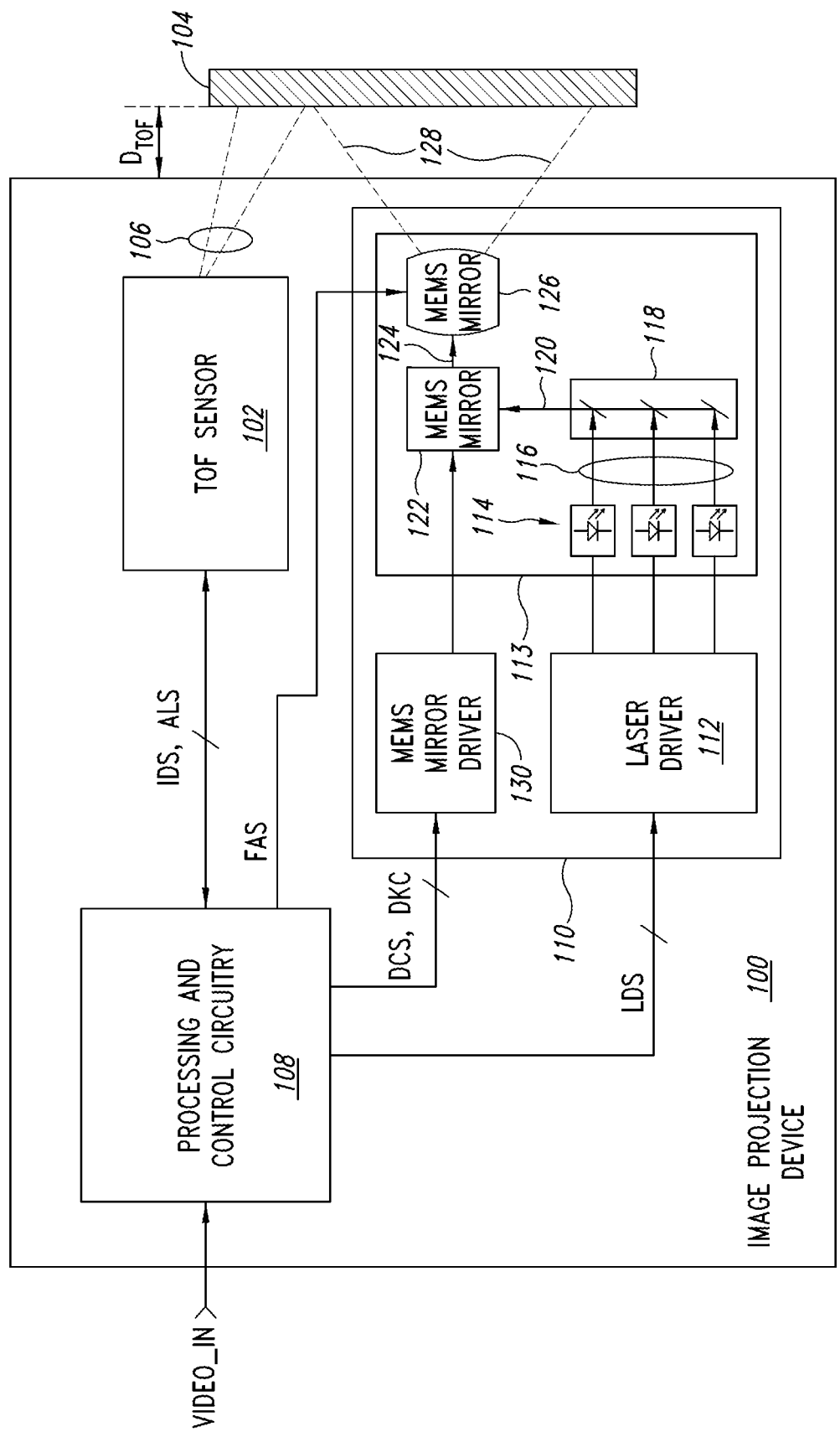
FIG. 1A is a functional block diagram of a pico projector image projection device including a time-of-flight (TOF) sensor for use in controlling the image projection device according to one embodiment of the present disclosure.

FIG. 1A is a functional block diagram of an image projection device 100 including a time-of-flight (TOF) sensor 102 for use in controlling a projection parameter of the image projection device, which in one embodiment includes the brightness of a projected image and in controlling the focusing of the projected image on a projection surface 104 such as a wall or another suitable flat surface. In operation, the TOF sensor 102 utilizes TOF based measurements to sense an imaging distance $D_{TOF}$ corresponding to the distance between the image projection device 100 and the projection surface 104, with the determined imaging distance $D_{TOF}$ then being utilized in controlling the brightness and focusing of the projected image, as will be described in more detail below.

In the following description, certain details are set forth in conjunction with the described embodiments to provide a sufficient understanding of the disclosure. One skilled in the art will appreciate, however, that the disclosure may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

The TOF sensor 102 transmits an optical signal that propagates towards the projection surface 104, and detects the time required for the transmitted optical signal to propagate to the projection surface and reflect off the projection surface and return to the TOF sensor. These transmitted and reflected optical signals are indicated generally as optical signals 106 in FIG. 1A. From the detected time, the TOF sensor 102 is able to detect or sense the imaging distance $D_{TOF}$ between the image projection device 100 and the projection surface 104. The TOF sensor generates an imaging distance signal IDS having a value indicating the sensed imaging distance $D_{TOF}$. In one embodiment, the TOF sensor 102 also senses the level of ambient light incident upon the TOF sensor, meaning the ambient light present in the environment in which the image projection device 100 and projection surface 104 are present. The TOF sensor 102 generates an ambient light signal ALS having a value indicating the sensed level of ambient light. The theory of operation of TOF sensors is well understood by those skilled in the art and thus will not be described in more detail herein, although several more detailed embodiments of the TOF sensor that may be used in the image projection device 100 will be described in more detail below with reference to FIGS. 5-10.

The image projection device 100 further includes processing and control circuitry 108 that receives the imaging distance signal IDS and ambient light signal ALS from the TOF sensor 102 and controls the overall operation of the image projection device 100. The process and control circuitry 108, which may be referred to simply as "control circuitry" in the present description, also receives input video data VIDEO_IN from an external source (not shown) and processes this video data for display by the image projection device 100 as projected images on the projection surface 104. More specifically, the control circuitry 108 processes the VIDEO_IN data and generates laser drive signals LDS, driver control signals DCS and a focus adjustment signal FAS that are applied to control image projection circuitry 110 in the image projection device 100. The image projection circuitry 110 projects images on the projection surface 104 based upon the LDS, DCS and FAS signals, as will be described in more detail below. Each of the TOF sensor 102, control circuitry 108, and image projection circuitry 110 may be formed from hardware circuitry, software, firmware, or any combination of hardware circuitry, software and firmware in embodiments of the image processing device 100.

The image processing circuitry 110 includes a laser driver 112 that receives the laser drive signals LDS and controls an optics engine 113 including a plurality of laser diodes 114 in response to the received laser drive signals. In example embodiment of FIG. 1A, the optics engine 113 includes three laser diodes 114, one for generating a red laser light beam, one for generating a green laser light beam, and one for generating a blue laser light beam. These laser light beams generated by the laser diodes 114 are designated 116 in FIG. 1A and are supplied to a beam combiner 118 that combines these three laser light beams into a single combined laser light beam 120. This combined laser light beam 120 from the beam combiner 118 is directed onto a microelectromechanical system (MEMS) mirror 122 which, in turn, generates a light beam 124 that is supplied through an adjustable projection lens 126 to provide a projected light beam 128. The focus adjustment signal FAS from the control circuitry 108 controls the focusing of the adjustable projection lens 126, as will be described in more detail below. The projected light beam 128 is projected onto the projection surface 104 to thereby project the desired projected image on the projection surface. A MEMS driver 130 in the image projection circuitry 110 receives the drive control signals DCS from the control circuitry 108 and controls the MEMS mirror 122 in response to the received drive control signals to form the desired light beam 124.

The image projection circuitry 110 may take a variety of different forms and the embodiment of FIG. 1A is presented merely as an example. For example, where the image projection device 100 is a pico projector the image projection circuitry 110 may be any of the three primary technologies currently being utilized for pico projectors, namely digital light processing (DLP), liquid crystal on silicon (LCoS), or laser-beam-steering (LBS) technology. Thus, the image projection circuitry 110 may utilize any of these technologies or any other suitable technology for generating the projected light beam 128 that is projected onto the projection surface 104 to thereby project the desired images on the projection surface. An image projection device according to another embodiment of the present disclosure will be described below in more detail with reference to FIG. 1B.

In operation, the control circuitry 108 receives the input video data VIDEO_IN and performs image processing on this data to generate the laser drive signals LDS and drive control signals DCS that are applied to control the image projection circuitry 110 to project the light beam 120 to form the desired images on the projection surface 104. Prior to the image projection circuitry 110 projecting the light beam 128 onto the projection surface 104, the TOF sensor 102 senses the imaging distance $D_{TOF}$ between the image TOF sensor and the projection surface 104 and provides the imaging distance signal IDS indicating this imaging distance to the control circuitry 108. The imaging distance $D_{TOF}$ between the TOF sensor 102 and the projection surface 104 indicates the distance between the image projection device 100 and the projection surface, and thus the distance $D_{TOF}$ may alternately be referred to herein as indicating the distance between the TOF sensor and projection surface or between the image projection device and the projection surface. The TOF sensor 102 also senses the level of ambient light present in the environment in which the image projection device 100 and projection surface 104 are present, and provides the ambient light signal ALS indicating this detected level of ambient light to the control circuitry 108. The control circuitry 108 controls the image projection circuitry 110 based upon the imaging distance signal IDS and ambient light signal ALS received from the TOF sensor 102, as will now be described in more detail.

The control circuitry 108 utilizes the ambient light signal ALS in generating the laser drive signals LDS supplied to control the laser driver 112. More specifically, the control circuitry adjusts the laser drive signals LDS to control the power or brightness of the light beams 106 generated by the laser diodes 114 and in this way controls the power or brightness of the projected light beam 128 generated by the image projection circuitry 110. When the ambient light signal ALS indicates the level of ambient light in the environment containing the image projection device 100 and projection surface 104 is high, the control circuitry 108 adjusts the laser drive signals LDS to increase the power of the light beams 106 generated by the laser diodes 114. Conversely, when ALS signal indicates a low level of ambient light in the environment, the control circuitry 108 adjusts the LDS signals to decrease the power of the light beams 106. In this way, the control circuitry 108 increases the brightness of the projected light beam 128 and thereby the brightness of the projected image on the projection surface 104 when the level of ambient light in the environment is high to help viewers see the projected image. In an environment with a low level of ambient light, the projected image on the projection surface 104 will be easier for viewers to see and thus the control circuitry decreases the brightness of the projected light beam 128.

The imaging distance signal IDS from the TOF sensor 102 is utilized by the control circuitry 108 in generating the focus adjustment signal FAS to control the adjustable projection lens 126 and thereby the focusing of the projected light beam 128 on the projection surface 104. The specific characteristics of the imaging distance signal IDS and the focus adjustment signal FAS, and the parameters utilized in controlling the adjustable projection lens 126, vary in different embodiments of the image projection device 100, as will be described in more detail below. Furthermore, in some embodiments of the image projection device 100 digital keystone correction may be utilized in controlling the focusing of the projected light beam 128 on the projection surface 104. In these embodiments, the control circuitry 108 generates digital keystone correction signals DKC that are applied to the MEMS mirror driver 130 or other type of driver to adjust the projected light beam 128 based upon the imaging distance signal IDS from the TOF sensor 102, as will also be described in more detail below.

Figure 1B:
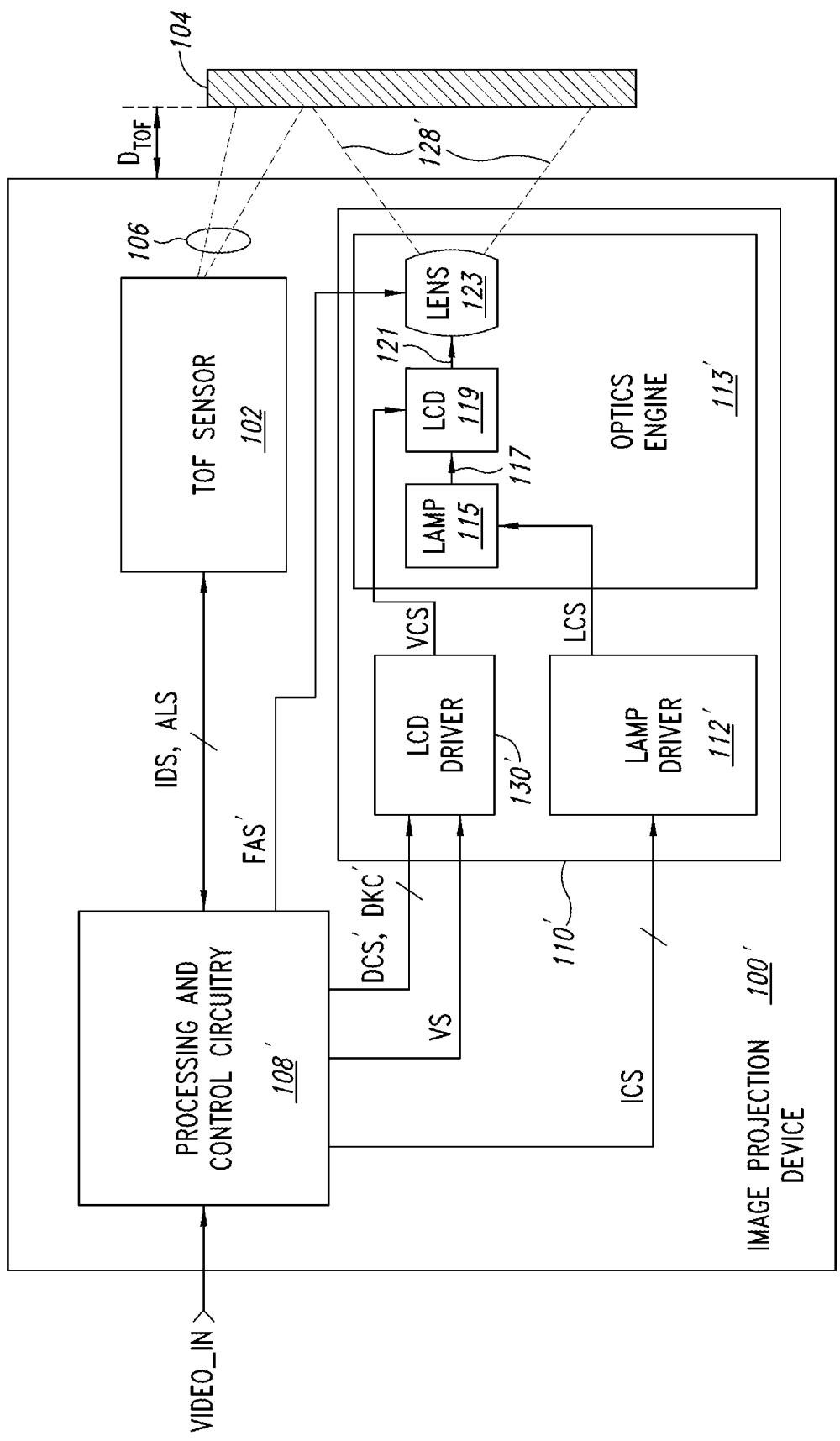
FIG. 1B is a functional block diagram of another type of image projection device including a time-of-flight (TOF) sensor for use in controlling the image projection device according to another embodiment of the present disclosure.

FIG. 1B is a functional block diagram of another type of image projection device 100' including the time-of-flight (TOF) sensor 102 for use in controlling the image projection device according to another embodiment of the present disclosure. Components in the image projection device 100' have been given the same reference numbers as corresponding components in the image projection device 100 of FIG. 1A where the components are identical, and have the same reference number designated with a prime (') where the components are similar but not be identical. The image projection device 100' is an LCD projector and includes the TOF sensor 102, processing and control circuitry 108' and image projection circuitry 110' that projects a projected light beam 128' onto the projection surface 104. The image projection circuitry 110' includes a lamp driver 112' that receives illumination control signals ICS from the control circuitry 108' and generates lamp control signals LCS based on the ICS signals to control an optics engine 113'. More specifically, the optics engine 113' includes a lamp 115 that functions as a light source for the projected light beam 128'. The lamp 115 generates a light beam 117 based on the LCS signals and may, for example, include red, green and blue light sources that collectively form the light beam 117. The control circuitry 108' utilizes the ambient light signal ALS from the TOF sensor 102 in generating illumination control signals ICS to control the power or brightness of the light beam 117 generated by the lamp 115.

The light beam 117 from the lamp 115 is supplied to an LCD 119 that is controlled by an LCD driver 130' in the image projection circuitry 110'. The control circuitry 108' supplies video signals VS containing the image data to be projected onto the projection surface 104 to the LCD driver 130'. The control circuitry 108' also supplies drive control signals DCS' and digital keystone correction DKC' signals to the LCD driver 130'. In operation, the LCD driver 130' generates the video control signals VCS based on the VS, DCS' and DKC' signals and applies the VCS signals to control the LCD 119. The VCS control signals control the LCD 119 to generate an image light beam 121 including a plurality of pixels that collectively form an image to be projected onto the projection surface 104. The LCD 119 generates each image light beam 121 based upon the VCS signals and the light beam 117 from the lamp 115. Although the LCD 119 is shown as being a transmissive type LCD device in the embodiment of FIG. 1B, the LCD could be a reflective or other suitable type of LCD device as well. The image light beam 121 is supplied to an adjustable lens 123 that projects the image light beam as the projected light beam 128' to form the desired projected image on the projection surface 104. The adjustable lens 123 focuses the projected light beam 128' on the projection surface 104 based upon the focus adjustment signal FAS provided by the control circuitry 108', which generates the FAS signal based upon the imaging distance signal IDS from the TOF sensor 102. In this way the control circuitry 108' controls the lens 123 to focus the projected light beam 128' onto the projection surface 104 based upon the detected imaging distance $D_{TOF}$ sensed by the TOF sensor 102.

Figure 2:
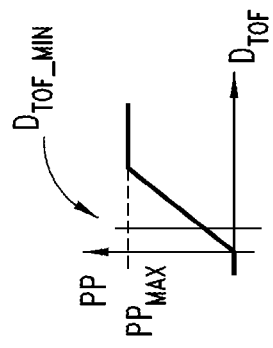
FIG. 2 is a graph illustrating control of the power of the projected light beam from the image projection devices of FIGS. 1A and 1B based upon detected imaging distance sensed by the TOF sensor according to one embodiment of the present disclosure.

The operation of the control circuitry 108 in controlling the image projection circuitry 110 based upon the imaging distance signal IDS and ambient light signal ALS generated by the TOF sensor 102 will now be described in more detail with reference to FIGS. 2-4. FIG. 2 is a graph illustrating control of the power of the projected light beam 128 from the image projection circuitry 110 based upon detected imaging distance $D_{TOF}$ sensed by the TOF sensor 102 according to one embodiment of imaging projection devices 100 and 100' of FIGS. 1A and 1B. In the graph of FIG. 2, the vertical axis corresponds to the power or brightness of the projected light beam 128 and is designated as the axis projected power PP in the figure. The horizontal axis is the detected imaging distance $D_{TOF}$.

In the embodiment of FIG. 2, the control circuitry 108, 108' adjusts the laser drive signals LDS or illumination control signals LCS to linearly adjust the brightness PP of the projected light beam 128, 128' as a function of the detected imaging distance $D_{TOF}$ up to a maximum power level $PP_{MAX}$. The following discussion will describe the control circuitry 108 in the embodiment of FIG. 1A by way of example, and from this description one skilled in the art will understand the analogous operation of the control circuitry 108' in the embodiment of FIG. 1B. The embodiment of FIG. 2 assumes relatively slow changes in the detected imaging distance $D_{TOF}$ such as may occur during normal use in setting up the image projection device 100 for use in projecting images onto the projection surface 104. In this way, the control circuitry 108 automatically adjusts the brightness of the projected light beam 128 as a function of the detected imaging distance $D_{TOF}$ so that the projected image generated by the projected light beam has a suitable brightness viewing by users of the image projection device 100. The farther away the projection surface 104 from the image projection device 100 the higher the brightness of the projected light beam 128 required for satisfactory viewing and, conversely, the closer the projection surface is to the image projection device the lower the required brightness. FIG. 2 also shows a minimum imaging distance threshold $D_{TOF\_MIN}$ which represents a minimum safe distance at which the image projection device 100 should be maintained from the projection surface 104 or from a person or animal. In this embodiment, the control circuitry 108 linearly controls the brightness PP of the projected light beam 128 as a function of distance $D_{TOF}$ below the threshold $D_{TOF\_MIN}$, with the magnitude of the brightness being controlled in this region at sufficiently low levels to make damage from the projected light beam 128 unlikely in this situation.

Figure 3:
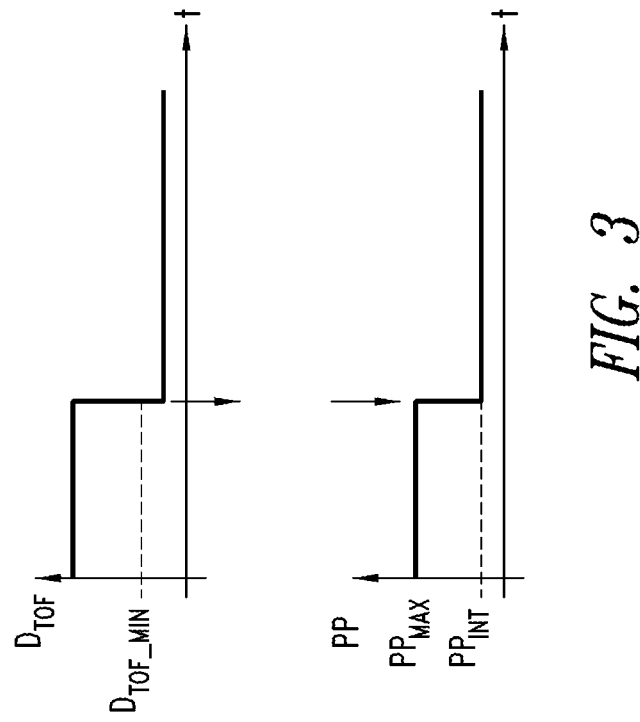
FIG. 3 is two graphs illustrating a power interrupt safety feature based upon the detected imaging distance sensed by the TOF sensor of FIGS. 1A and 1B according to another embodiment of the present disclosure.

FIG. 3 is two graphs illustrating a power interrupt safety feature based upon the detected imaging distance $D_{TOF}$ sensed by the TOF sensor 102 of FIGS. 1A and 1B according to another embodiment of the image projection devices 100 and 100'. The control of the power or brightness of the projected light beam 128 illustrated in the embodiment of FIG. 3 provides protection against injury due to the projected light beam. This could occur, for example, where a small child passes between the image projection device 100 and the projection surface 104 near the image projection device, or where a child picks up the image projection device and points the projected light beam 128 towards his or her eyes. The embodiment of FIG. 2 detects such a situation through a rapid decrease in the detected imaging distance $D_{TOF}$ sensed by the TOF sensor 102. When the detected imaging distance $D_{TOF}$ is less than or equal to the minimum imaging distance threshold $D_{TOF\_MIN}$, the control circuitry 108 very quickly reduces the power of the projected light beam 128 to a minimum interrupt power level $PP_{INT}$. The minimum interrupt power level $PP_{INT}$ could be zero, meaning the control circuitry 108 sets the LDS signals to cause the laser driver 112 to turn OFF the laser diodes 114. Through this control the control circuitry 108 prevents, or significantly reduces the likelihood of, the projected light beam 128 causing damage to the eyes of a child, pet, or any other individual in this situation.

Figure 4:
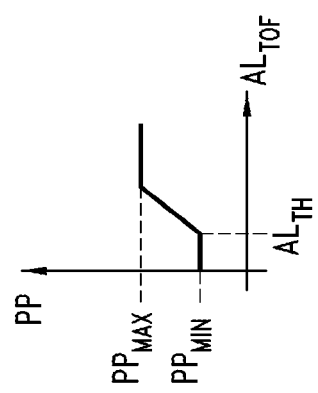
FIG. 4 is a graph illustrating control of the power of the projected light beam from the image projection devices of FIGS. 1A and 1B based upon the level of ambient light sensed by the TOF sensor according to another embodiment of the present disclosure.

FIG. 4 is a graph illustrating control of the power or brightness of the projected light beam 128 from the image projection devices 100 and 100' of FIGS. 1A and 1B based upon the level of ambient light sensed by the TOF sensor 102 according to another embodiment of the present disclosure. Recall, as mentioned above the TOF sensor 102 generates the ambient light signal ALS having a value indicating the sensed level of ambient light incident upon the TOF sensor 102, meaning the level of ambient light present in the environment containing the image projection device 100 and the projection surface 104. The control circuitry 108, 108' controls the LDS signals, or the ICS signals, to thereby control the power of the projected light beam 128, 128' as a function of the level of ambient light indicated by the ambient light signal ALS from the TOF sensor 102. In the embodiment of FIG. 4, the control circuitry 108 maintains the brightness of the projected light beam 128 at a minimum power level $PP_{MIN}$ until the ambient light signal ALS indicates the level of ambient light has reached an ambient light threshold $AL_{TH}$. Once the ALS signal reaches the ambient light threshold $AL_{TH}$, the control circuitry 108 then controls the brightness of the projected light beam 128 linearly as a function of the level of ambient light indicated by the ambient light signal up to a maximum power level $PP_{MAX}$.

Figure 5:
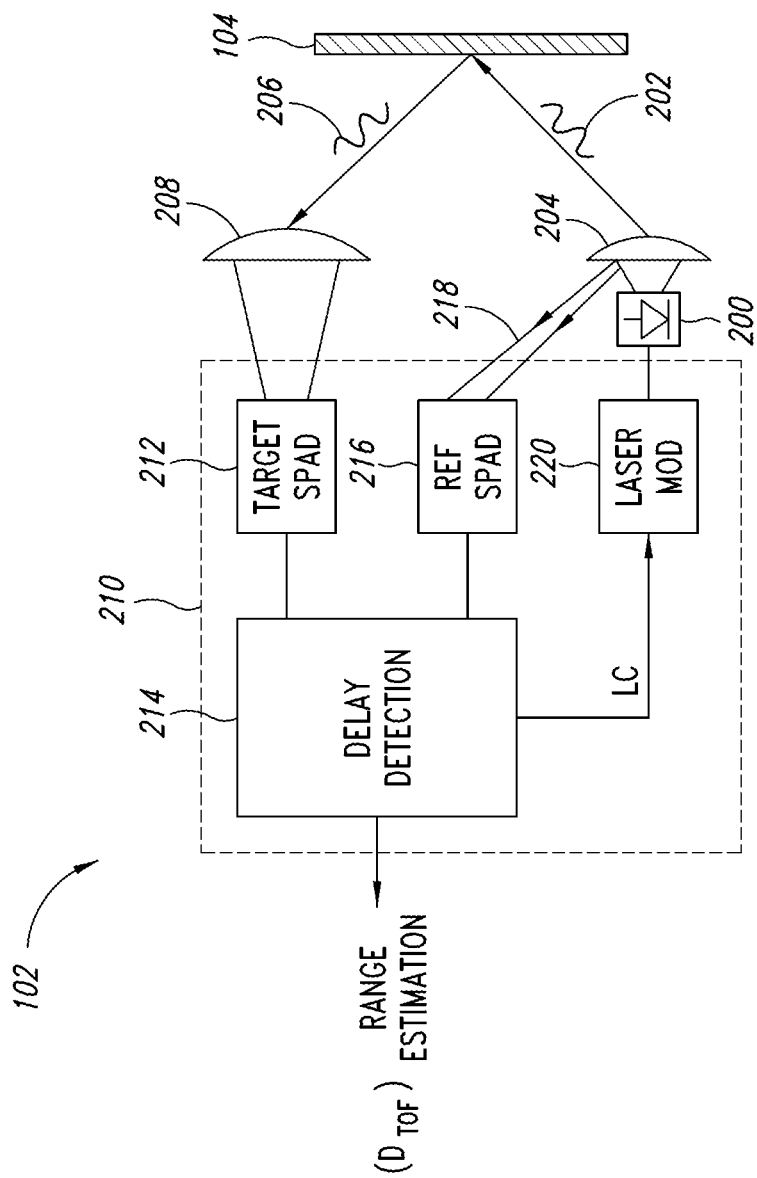
FIG. 5 is a more detailed functional block diagram of one embodiment of the TOF sensor of FIGS. 1A and 1B.

FIG. 5 is a more detailed functional block diagram of one embodiment of the TOF sensor 102 of FIGS. 1A and 1B. In this embodiment, the TOF range detection circuit 104 includes a light source 200, which is for example a laser diode, for generating a transmitted optical pulse signal 202 that is transmitted into the image scene on the projection surface 104 through a projection lens 204. The image scene on the projection surface 104 includes a field of view (FOV) of the TOF sensor 102 as well as a FOV of the image projection circuitry 110, as will be discussed in more detail below in relation to FIGS. 7, 9 and 10.

A returned or reflected optical pulse signal 206, which is the reflected portion of the transmitted optical pulse signal 202, is received through a reflection lens 208 in the TOF sensor 102. The lens 208 directs the reflected optical pulse signal 206 to range estimation circuitry 210 for estimating the imaging distance $D_{TOF}$ between TOF sensor 102 and the projection surface 104, as previously discussed generally with reference to FIG. 1A. The range estimation circuitry 210 includes a target single-photon avalanche diode (SPAD) array 212, which receives the returned optical pulse signal 206 via the lens 208. The target SPAD array 212 typically includes are large number of SPAD cells (not shown in FIG.

5), each cell including a SPAD for sensing a photon of the reflected optical pulse 206. In some embodiments of the TOF sensor 102, the lens 208 directs reflected optical pulse signals 206 from certain spatial zones on the projection surface 104 to certain groups of SPAD cells or zones of SPAD cells in the target SPAD array 212, as will be described in more detail below with reference to FIGS. 6A, 6B, 9 and 10.

Each SPAD cell in the SPAD array 208 will provide an output pulse or SPAD event when a photon in the form of the returned optical pulse signal 206 is detected by that cell in the target SPAD array 212. A delay detection circuit 214 determines a delay time between transmitted optical pulse signal 202 and a SPAD event from the SPAD array 212, which corresponds to the return of the reflected optical pulse signal 206 to the SPAD array. In this way, by detecting these SPAD events an arrival time of the return or reflected optical pulse signal 206 can be estimated. A delay detection circuit 214 determines the time of flight based upon the difference between the transmission time of the transmitted optical pulse signal 202 and the arrival time of the returned optical pulse signal 206 as sensed by the SPAD array 212.

A reference SPAD array 216 receives an internal reflection 218 of the transmitted optical pulse signal 202 from the lens 204 upon transmission of the transmitted optical pulse signal. The reference SPAD array 216 effectively receives the internal reflection 218 of the transmitted optical pulse signal 202 at the same time the transmitted optical pulse signal is transmitted. In response to this received internal reflection 218, the reference SPAD array 216 generates a corresponding SPAD event indicating the transmission of the transmitted optical pulse signal 202. The delay detection circuit 214 includes suitable circuitry, such as time-to-digital converters or time-to-analog converters, to determine a time or time-of-flight TOF between the transmission of the transmitted optical pulse signal 202 and receipt of the reflected optical pulse signal 208. The delay detection circuit 214 then utilizes this TOF to determine the imaging distance $D_{TOF}$ of the projection surface 104. The range estimation circuit 210 further includes a laser modulation circuit 220 that drives the light source 200. A delay detection circuit 214 generates a laser control signal LC that is supplied to the laser modulation circuit 222 control activation of the laser 200 and thereby transmission of the transmitted optical pulse signal 202.

Figure 6A:
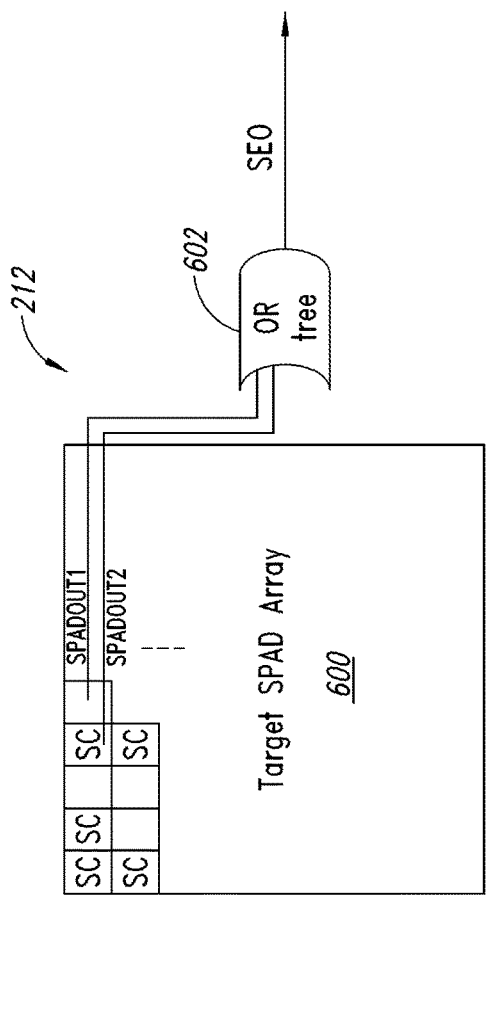
FIG. 6A is a functional diagram of a single zone embodiment of the target single photon avalanche diode (SPAD) array contained in the TOF sensor of FIG. 5.

FIG. 6A is a functional diagram of a single zone embodiment of the target SPAD array 212 of FIG. 5. In this embodiment, the target SPAD array 212 includes a SPAD array 600 including a plurality of SPAD cells SC, some of which are illustrated and labeled in the upper left portion of the SPAD array. Each of these SPAD cells SC has an output, with two outputs labeled SPADOUT1, SPADOUT2 shown for two SPAD cells by way of example in the figure. The output of each SPAD cell SC is coupled to a corresponding input of an OR tree circuit 602. In operation, when any of the SPAD cells SC receives a photon from the reflected optical pulse signal 206, the SPAD cell provides an active pulse on its output. Thus, for example, if the SPAD cell SC having the output designated SPADOUT2 in the figure receives a photon from the reflected optical pulse signal 206, then that SPAD cell will pulse the output SPADOUT2 active. In response to the active pulse on the SPADOUT2, the OR tree circuit 602 will provide an active SPAD event output signal SEO on its output. Thus, whenever any of the SPAD cells SC in the array 600 detects a photon, the OR tree circuit 602 provides an active SEO signal on its output.

Figure 6B:
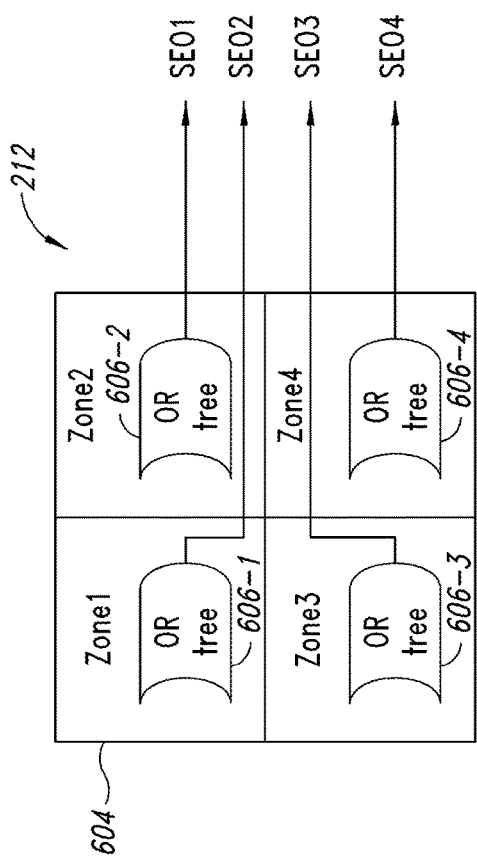
FIG. 6B is a functional diagram of a multi zone embodiment of the target SPAD array contained in the TOF sensor of FIG. 5.

FIG. 6B is a functional diagram of a multi zone embodiment of the target SPAD array 212 FIG. 5. In this embodiment, the target SPAD array 212 includes a SPAD array 604 has four array zones ZONE1-ZONE4, each array zone including a plurality of SPAD cells. Four zones ZONE1-ZONE4 are shown by way of example and the SPAD array 604 may include more or fewer zones. A zone in the SPAD array 604 is a portion of the SPAD cells SC in the entire SPAD array. The SPAD cells SC in each zone ZONE1-ZONE4 have their output coupled to a corresponding OR tree circuit 606-1 to 606-4. The SPAD cells SC and outputs of these cells coupled to the corresponding OR tree circuit 606-1 to 606-4 are not shown in FIG. 6B to simplify the figure.

In operation, when any of the SPAD cells SC in a given zone ZONE1-ZONE4 receives a photon from the reflected optical pulse signal 206, the SPAD cell provides an active pulse on its output that is supplied to the corresponding OR tree circuit 606-1 to 606-4. Thus, for example, when one of the SPAD cells SC in the zone ZONE1 detects a photon that SPAD cell provides and active pulse on its output and the OR tree circuit 606-1, in turns, provides an active SPAD event output signal SEO1 on its output. In this way, each of the zones ZONE1-ZONE4 operates independently to detect SPAD events (i.e., receive photons from reflected optical pulse signals 206 in FIG. 5). In this embodiment, the lens 208 (FIG. 5) directs reflected optical pulse signals 206 from individual spatial zones on the projection surface 104 to different array zones ZONE1-ZONE4 such that the TOF sensor 102 can sense multiple distances on the projection surface 104, as will be described in more detail below with reference to FIGS. 9 and 10.

Embodiments of the TOF sensor 102 utilizing multiple array zones and multiple spatial zones as described in the present application are described in more detail in U.S. patent application Ser. No. 15/168,535, which is entitled RANGING APPARATUS and which is incorporated herein by reference in its entirety.

Figure 7:
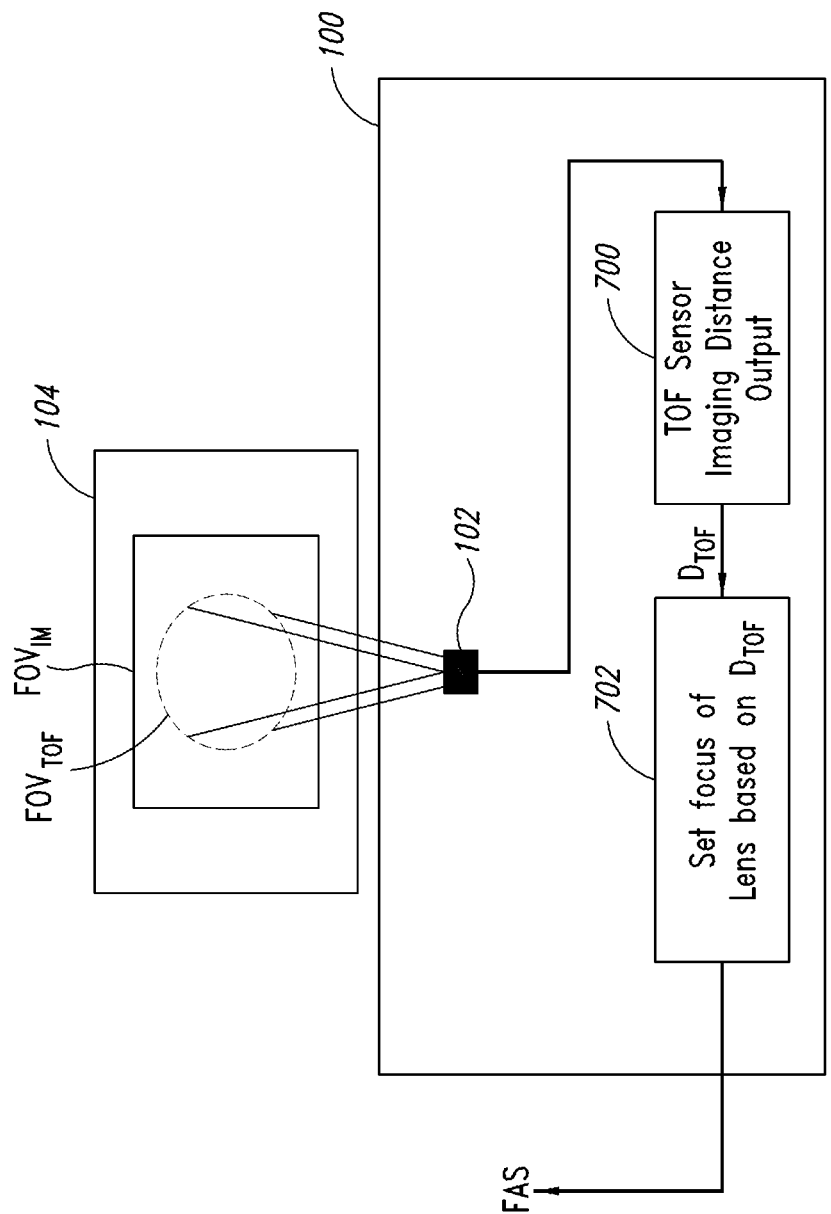
FIG. 7 is a functional diagram illustrating the operation of the image projection devices of FIGS. 1A and 1B in generating a focus adjustment signal to adjust the focus of an image being projected when the TOF sensor includes the single zone SPAD array of FIG. 6A.

FIG. 7 is a functional diagram illustrating the operation of the TOF sensor 102 and control circuitry 108 of FIGS. 1A and 1B in generating the focus adjustment signal FAS to adjust the focus of the projected image on the projection surface 104 when the TOF sensor includes the single zone SPAD array 212 of FIG. 6A. This operation will now be described with reference to FIGS. 1, 5 and 7. FIG. 7 illustrates the projection surface 104 along with an imaging field-of-view $FOV_{IM}$ on the projection surface. The imaging field-of-view $FOV_{IM}$ is the field-of-view of the projected light beam 128 from the image projection circuitry 110 and thus is the field-of-view of the projected image on the projection surface 104. FIG. 7 also illustrates a TOF sensor field-of-view $FOV_{TOF}$ which indicates the field-of-view of the TOF sensor 102. The field-of-view $FOV_{TOF}$ is contained within the imaging field-of-view $FOV_{IM}$ and is in some embodiments approximately the same size as the imaging field-of-view, although shown as being smaller in FIG. 7 for ease of illustration.

FIG. 7 represents the image projection device 100 adjacent the projection surface 104 and illustrates the functional operations of the TOF sensor 102 in the block 700 and the functional operation of the control circuitry 108 in the block 702 in the figure. The TOF sensor 102 illuminates the field-of-view $FOV_{TOF}$ on the projection surface 104 with a projection pattern formed through the transmitted optical signal 202 (FIG. 5), and this signal is then reflected and sensed by the target SPAD array 212 (FIG. 5) as previously described. The TOF sensor 102 then calculates the imaging distance $D_{TOF}$ between the image projection device 100 and the projection surface 104 and supplies this imaging distance to the control circuitry 108 which, in turn, generates the FAS signal to set the focus of the adjustable projection lens 126 to properly focus the projected image within the imaging field-of-view $FOV_{IM}$ on the projection surface. In this embodiment, the control circuitry 108 in the block 702 may calculate an average of the imaging distance $D_{TOF}$ over time to generate an average imaging distance $D_{TOF\_AVG}$, and then use this average imaging distance to generate the FAS signal to adjust the adjustable projection lens 126 to focus the projected light beam 128 based on the average imaging distance.

Figure 8:
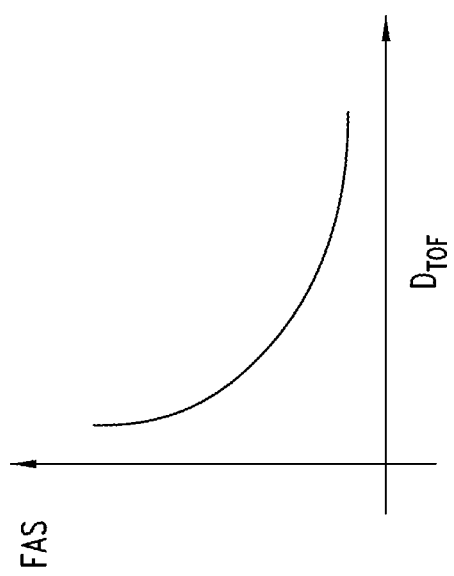
FIG. 8 is a graph illustrating the value of the focus adjustment signal as a function of the detected distance sensed by the TOF sensor in the embodiment of FIG. 7.

FIG. 8 is a graph illustrating the value of the focus adjustment signal FAS as a function of the detected imaging distance $D_{TOF}$ sensed by the TOF sensor 102 in the embodiment of FIG. 7. The value of the FAS signal has an inverse relationship to the detected imaging distance $D_{TOF}$ and the control circuitry 108 may include a look-up table LUT to implement this embodiment. The LUT would include a plurality of FAS signal and imaging distance $D_{TOF}$ values, each value for the FAS signal being associated a corresponding imaging distance value. The control circuitry 108 generates the FAS signal from the LUT based upon the detected imaging distance $D_{TOF}$ from the TOF sensor 102 and this FAS signal is applied to the adjustable projection lens 126 to thereby adjust the lens to focus the projected image on the projection surface 104.

FIGS. 9A and 9B are functional diagrams illustrating the operation of the image projection devices 100 and 100' of FIGS. 1A and 1B in generating the focus adjustment signal FAS to control the focus of a projected image being projected onto the projection surface 104 when the TOF sensor 102 includes the multi zone SPAD array 212 of FIG. 6B. In this embodiment, the transmitted optical pulse signal 202 is transmitted through the projection lens 204 to form four projection patterns that illuminate four distinct spatial zones SZ1-SZ4 within the imaging field-of-view $FOV_{IM}$ on the projection surface 104, where the imaging field-of-view is assumed to be the same as the TOF field-of-view $FOV_{TOF}$ in this example. The number of spatial zones SZ would be the same as the number of array zones ZONE1-ZONE4 in the target SPAD array 212 as shown in FIG. 6. Where the target SPAD array 212 includes a different number of array zones and/or a different arrangement of the array zones then the number and arrangement of the spatial zones SZ on the projection surface 104 will likewise vary.

Each of the array zones ZONE1-ZONE4 outputs respective SPAD event output signals SEO1-SEO4 as previously described and the TOF sensor 102 accordingly calculates four different imaging distances $D_{TOF1}$-$D_{TOF4}$, one for each of the spatial zones SZ1-SZ4. Thus, in this embodiment the imaging distance signal IDS generated by the TOF sensor 102 includes four different values for the four different detected imaging distances $D_{TOF1}$-$D_{TOF4}$. Each of these detected imaging distances $D_{TOF1}$-$D_{TOF4}$ is shown to have the value 5 in FIG. 9A. The value 5 was arbitrarily selected just to represent the value of each of the detected imaging distances $D_{TOF1}$-$D_{TOF4}$ and to illustrate that in the example of FIG. 9A each of these detected imaging distances has the same value. Thus, in this situation the projection surface 104 is properly aligned in relation to the image projection device 100 and the control circuitry 108 generates the focus adjustment signal FAS to move the adjustable projection lens 126 towards or away from the projection surface based upon the detected imaging distances $D_{TOF1}$-$D_{TOF4}$ as contained in the IDS signal to properly focus the projected image on the projection surface. The control circuitry 108 could, for example, calculate an average value imaging distance $D_{TOF\_AVG}$ over time to generate an average imaging distance $D_{TOF\_AVG}$, from the distances $D_{TOF1}$-$D_{TOF4}$ then use this average to adjust the adjustable projection lens 126 to focus the projected light beam 128 based on the average imaging distance.

FIG. 9B illustrates a situation where the projection surface 104 is skewed relative to the position of the image projection device 100. The surface 104 may also be curved such that the distance from the image projection device to the actual surface is different depending on a location on the surface. As a result of this skew of the projection surface 104, the TOF sensor 102 senses different values for the detected imaging distances $D_{TOF1}$-$D_{TOF4}$ of the spatial zones SZ1-SZ4. These detected imaging distances $D_{TOF1}$-$D_{TOF4}$ are shown to have the values 7 and 7 detected imaging distances $D_{TOF1}$ and $D_{TOF3}$ for spatial zones SZ1 and SZ3. The detected imaging distance $D_{TOF2}$ for the spatial zone SZ2 has the value 5 while the detected imaging distance $D_{TOF4}$ for the spatial zones SZ4 has the value 4. Thus, in this situation the projection surface 104 is not properly aligned in relation to the image projection device 100 and the control circuitry 108 detects this situation through these different values for the detected imaging distances $D_{TOF1}$-$D_{TOF4}$.

The control circuitry 108 then generates the focus adjustment signal FAS control the adjustable projection lens 126 to compensate for the skewed projection surface 104 and properly focus the projected image on this projection surface. This control illustrated through the circle 126 representing the adjustable projection lens and the arched arrow representing adjustment of this lens through the LAS signal. Alternatively, or in addition to controlling the adjustable projection lens 126 to properly focus the projected image, the control circuitry 108, 108' may also generate digital keystone correction signals DKC, DKC' that are applied to the MEMS mirror driver 130 or LCD driver 130' to apply digital keystoning to the projected image to compensate for the skew of the projection surface 104, as mentioned above. This is represented through the DKC box in FIG. 9B. Digital keystone correction of a projected image will be understood by those skilled in the art and thus will not be described in detail herein.

FIGS. 10A and 10B are functional diagrams illustrating two possible spatial projection patterns that may be used in combination with multi zone SPAD arrays in the TOF sensor of FIG. 5 according to further embodiments of the present disclosure. The embodiment of FIG. 10A includes five spatial zones SZ1-SZ5 arranged within TOF the field-of-view $FOV_{TOF}$ as shown on the top of this figure. In this situation, the multi zone SPAD array 212 of FIG. 6B would include five array zones, each having a corresponding output such that the TOF sensor 102 provides five detected imaging distances $D_{TOF1}$-$D_{TOF5}$ as shown in the figure. The values for each of these detected imaging distances $D_{TOF1}$-$D_{TOF5}$ are shown simply to illustrate that the control circuitry 108 processes these five distance values for use in controlling the focusing the projected image, as represented through the box LAS/DKC in the figure. FIG. 10B is simply another example of a possible arrangement of array zones in the SPAD array 212 of FIG. 6B and corresponding spatial zones SZ in the TOF the field-of-view $FOV_{TOF}$ on the projection surface 104. This embodiment includes nine spatial zones SZ1-SZ9 and nine corresponding array zones in the SPAD array 212 of FIG. 6B, with the control circuitry 108 again controlling the focusing of the projected image on the projection surface using the nine detected imaging distances $D_{TOF1}$-$D_{TOF9}$ to control the focusing of the projected image, again as represented through the box LAS/SKC.

While in the present description embodiments are described including a TOF ranging device including SPAD arrays, the principles of the circuits and methods described herein for calculating a distance to a projection surface or other object could be applied to arrays formed of other types of photon detection devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image projection device, comprising:
image projection circuitry configured to generate a light beam having a power, and to project the light beam onto and focus the light beam on a projection surface located an imaging distance from the image projection circuitry;
a time-of-flight sensor configured to sense the imaging distance between the image projection circuitry and the projection surface, and to generate an imaging distance signal based on the sensed imaging distance; and
control circuitry coupled to the image projection circuitry and to the time-of-flight sensor, the control circuitry configured to adjust the power based upon the imaging distance signal and configured to adjust the power of the light beam as a linear function of the imaging distance signal in response to gradual changes in the imaging distance signal beyond a minimum imaging distance threshold and to reduce the power of the light beam to a power interrupt threshold substantially instantaneously in response to a discontinuous change of the imaging distance signal below the minimum imaging distance threshold.

2. The image projection device of claim 1, wherein the time-of-flight sensor is further configured to sense a level of ambient light incident upon the time-of-flight sensor and to generate an ambient light signal based on the sensed level of ambient light, and wherein the control circuitry is further configured adjust the power of the light beam based upon the ambient light signal.

3. The image projection device of claim 1, wherein the image projection circuitry comprises an optical engine including a plurality of laser diodes.

4. The image projection device of claim 1, wherein the time-of-flight sensor comprises a single zone single photon avalanche diode array.

5. The image projection device of claim 1, wherein the time-of-flight sensor comprises a multi zone single photon avalanche diode array.

6. The image projection device of claim 5,
wherein the imaging projection circuitry is configured to project the light beam onto the projection surface within an image projection field of view on the projection surface to generate a projected image in the image projection field of view;
wherein the time-of-flight sensor is further configured to project the light beam to generate a plurality of projection patterns, each projection pattern being projected onto a respective one of a plurality of spatial zones on the projection surface;
wherein the multi zone photon avalanche diode array includes a plurality of array zones, each of the plurality of array zones being configured to sense reflection of the projected light beam off a corresponding one of the plurality of spatial zones, and the multi zone photon avalanche diode array configured to generate for each of the plurality array zones a corresponding zone sensed event signal based on the sensed reflection of the projected light beam off the corresponding spatial zone; and
wherein the time-of-fight sensor is configured to generate a plurality of zone imaging distance signals, each of the plurality of zone imaging distance signals being based upon the zone sensed event signal of a corresponding one of the plurality of array zones and indicating an imaging distance between the time-of-flight sensor and the corresponding one of the plurality of spatial zones.

7. The image projection device of claim 6, wherein the control circuitry is configured to control the image projection circuitry to adjust the focus of the projected image based upon the plurality of zone imaging distance signals.

8. The image projection device of claim 7, wherein the control circuitry is configured to control the image projection circuitry to adjust the focus through digital keystone correction.

9. The image projection device of claim 7, wherein the image projection circuitry further comprises an adjustable projection lens configured to adjust the focus of the projected image based upon a focus adjustment signal, and wherein the control circuitry is configured to generate the focus adjustment signal based upon the plurality of zone imaging distance signals to adjust the focus of the projected image.

10. The image projection device of claim 6, wherein the plurality of spatial zones includes a plurality of spatial zones arranged in rows and columns within a field of view of the time-of-flight sensor.

11. The image projection device of claim 10, wherein each row of spatial zones includes the same number of spatial zones and each column of spatial zones includes the same number of columns.

12. The image projection device of claim 10, wherein the time-of-flight sensor field of view is approximately the same as the image projection field of view.

13. A method of controlling a projected light beam, the method comprising:
projecting an image onto a projection surface positioned at an imaging distance, the image having a brightness;
transmitting an optical signal onto a spatial zone on the projection surface;
sensing a reflected optical signal that is reflected off the spatial zone responsive to the transmitted optical signal;
determining the imaging distance based upon time-of-flight measurements of the transmitted and reflected optical signals;
determining a rate of change of the determined imaging distance;
controlling the brightness of the projected image based upon the determined imaging distance to project the image onto the projection surface having the controlled brightness;
adjusting the brightness of the projected image as a linear function of the imaging distance in response to gradual changes in the determined imaging distance beyond a minimum imaging distance threshold;

determining whether the imaging distance has reached the minimum imaging distance threshold; and reducing the brightness of the projected image to a brightness interrupt threshold in response to determining a discontinuous change of the imaging distance signal below the minimum distance threshold.

14. The method of claim 13 further comprising:

sensing a level of ambient light based upon time-of-flight measurements of the transmitted and reflected optical signals; and controlling the brightness of the projected image based upon the sensed level of ambient light.

15. The method of claim 13, wherein transmitting an optical signal onto a spatial zone on the projection surface comprises transmitting an infrared optical signal onto the spatial zone.

16. The method of claim 13, wherein controlling the brightness of the projected image based upon the determined imaging distance comprises increasing and decreasing the brightness of the projected image as a linear function of the determined imaging distance.

17. An image projection device, comprising:

image projection circuitry configured to generate a light beam and to project the light beam onto a projection surface located an imaging distance from the image projection circuitry;

a time-of-flight sensor configured to sense the imaging distance between the image projection circuitry and the projection surface, and to generate an imaging distance signal based on the sensed imaging distance; and control circuitry coupled to the image projection circuitry and to the time-of-flight sensor, the control circuitry configured to adjust a brightness of the light beam as a linear function of the imaging distance signal in response to gradual changes of the imaging distance signal beyond a minimum imaging distance threshold, and the control circuitry further configured to determine whether the determined imaging distance is less than the minimum imaging distance threshold and to control the brightness based on the determined imaging distance below the minimum imaging distance threshold, and further configured to reduce the brightness to a power interrupt threshold substantially instantaneously responsive to a discontinuous change in the imaging distance signal below the minimum imaging distance threshold.

18. The image projection device of claim 17, wherein the control circuitry is further configured to control the brightness of the projected light beam as a linear function of the determined imaging distance below the minimum imaging distance threshold responsive to continuous changes in the imaging distance.

19. The image projection device of claim 17, wherein the control circuitry is further configured to adjust a focus of the light beam based on the determined imaging distance.

20. The image projection device of claim 1, wherein the control circuitry further comprises a look-up table including a plurality of focus values and imaging distance values, each focus value being associated a corresponding imaging distance value and wherein the control circuitry is configured to adjust the focus of the light beam using the focus value associated with an imaging distance value indicated by the imaging distance signal.

21. The image projection device of claim 1, wherein the control circuitry is further configured to calculate an average of the imaging distance signal over time to generate an average imaging distance value, and is further configured to adjust the focus of the light beam based on the average imaging distance value.

22. The method of claim 13, further comprising:

determining an average of the determined imaging distance over time; and focusing the projected image based upon the average of the determined imaging distance over time.

* * * * *